Dec. 29, 1964     L. TROY     3,163,461
FLOOR SUPPORT

Filed Dec. 8, 1961     2 Sheets-Sheet 1

INVENTOR.
LEONARD TROY
BY
Samuel Meerkreebs
ATTORNEY

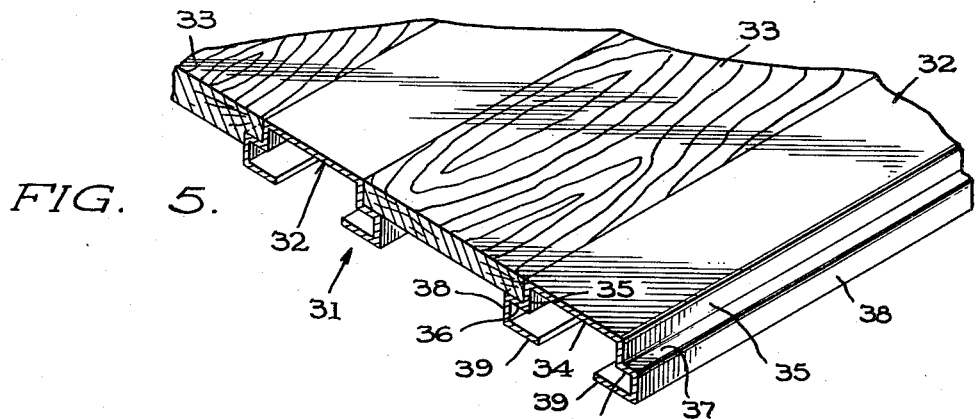
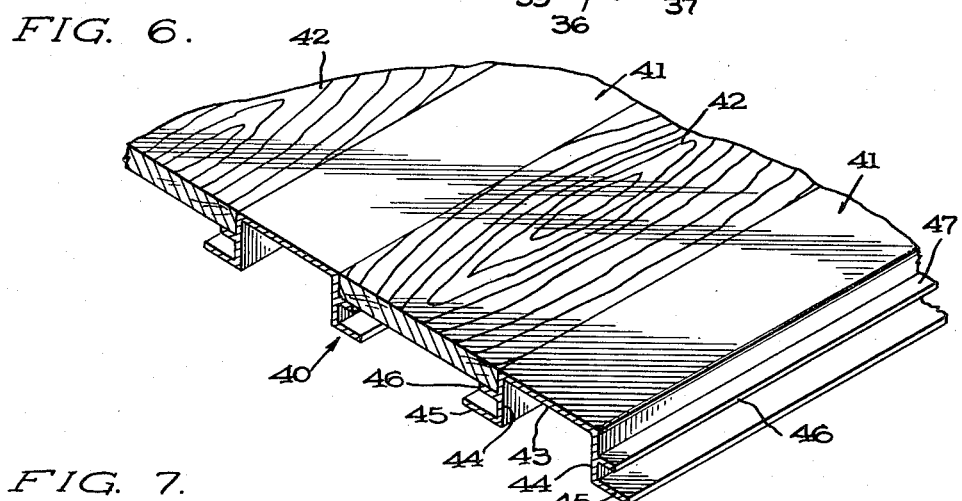
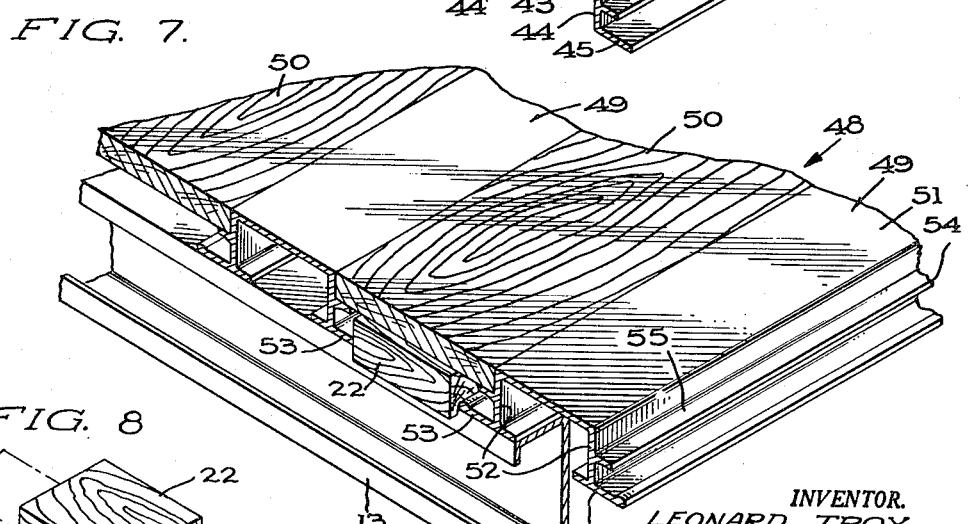
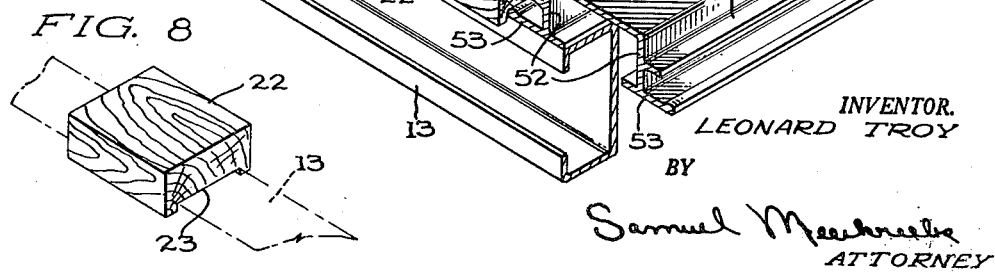

United States Patent Office 3,163,461
Patented Dec. 29, 1964

3,163,461
FLOOR SUPPORT
Leonard Troy, 5 Pen-Y-Bryn Drive, Scranton, Pa.
Filed Dec. 8, 1961, Ser. No. 158,297
8 Claims. (Cl. 296—28)

This invention relates in general to new and useful improvements in trucks and trailer construction, and more particularly to a novel floor construction for use in conjunction with trucks and trailers.

Although truck and trailer beds or floors are primarily formed of metal to provide the adequate support for the loads carried thereon, in many instances, it is desired to have wooden portions so as to facilitate the holding down of cargo by nailing. As a result, on certain types of trucks and trailers, the floors are formed of alternating metal beams and wooden strips. The difficulty with such construction is that the metal beams are relatively thick to provide the necessary strength whereas the wooden strips need not be of such a thickness. However, it is necessary that thick wooden strips be utilized in order to provide the necessary flush floor surface. This, of course, is at an extra cost which is unnecessary.

In view of the foregoing, it is the primary object of this invention to provide a novel floor construction for trucks and trailers wherein the metal beams forming parts of the floor construction are provided with suitable seats having upper surfaces disposed midheight of the beams whereby wooden strips disposed between the beams may be relatively thin and still have upper surfaces disposed substantially flush with the upper surfaces of the metal beams.

Another object of this invention is to provide a novel floor beam which is generally of a channel cross-section and includes an upper surface defined by a web, a pair of vertical flanges, and lower support flanges at the lower edges of the vertical flanges, the vertical flanges also having attached thereto intermediate horizontal flanges which function as seats for wooden strips adapted to extend longitudinally between a pair of beams.

A further object of this invention is to provide a novel composite metal and wooden floor for use in trucks and trailers, as well as other types of transportation vehicles, the floor utilizing relatively deep metal beams which provide for high strength with a minimum of weight, and the beams being provided intermediate their heights with suitable seats for wooden strips adapted to be alternated with the beams, the wooden strips being relatively thin as compared to the height of the beams whereby only the required thickness of wooden strips may be utilized.

A still further object of this invention is to provide a novel floor construction which includes a plurality of transverse supports on which longitudinally extending metal beams are carried, the metal beams being alternated with wooden strips and the wooden strips being supported on seats carried by the metal beams intermediate the height of the metal beams, and the wooden strips being further supported by support blocks carried by the transverse suppotrs and underlying the wooden strips intermediate the metal beams.

With the above and other objects in view that will hereinafter appear, the nature of the invention will be more clearly understood by reference to the following detailed description, the appended claims and the several views illustrated in the accompanying drawings.

In the drawings:

FIGURE 5 is a perspective view of a floor unit showing the use of still another form of metal beam.

FIGURE 6 is a fragmentary perspective view similar to FIGURE 5, showing still another form of metal beam used in the floor construction.

FIGURE 7 is a fragmentary perspective view similar to FIGURE 2 and shows a floor construction incorporating still a further form of metal beams.

FIGURE 8 is an enlarged perspective view of an intermediate support for a wooden strip or plank and shown in position on a transverse support, the transverse support being shown by dotted lines.

Figure 1:
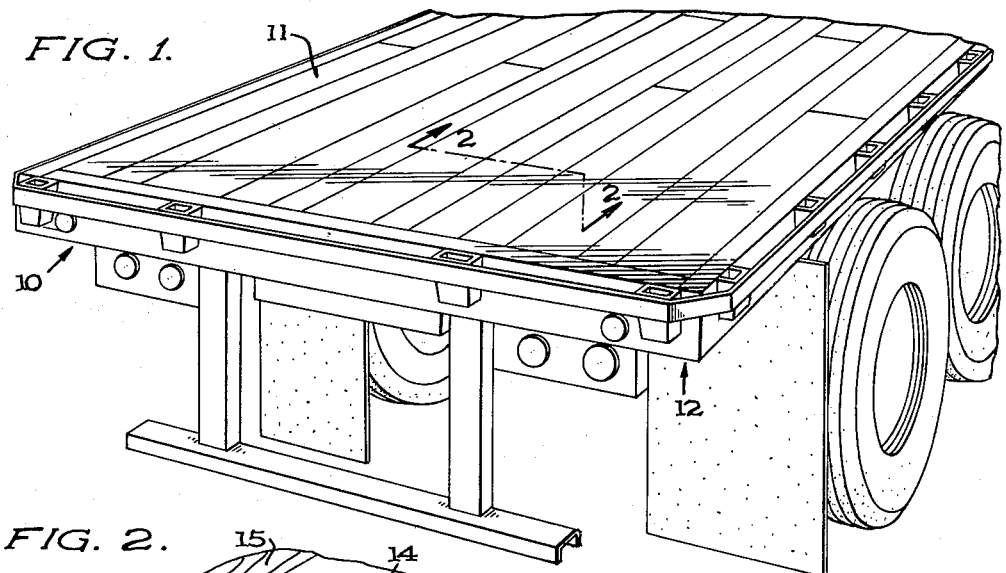
FIGURE 1 is a rear fragmentary perspective view of a truck or trailer incorporating the floor construction which is the subject of this invention.

Referring now to FIGURE 1 in particular, it will be seen that there is illustrated the rear portion of a vehicle construction which is generally referred to by the numeral 10. The vehicle illustrated in FIGURE 1 may either be a truck or a trailer. It is, however, immaterial as to the particular type of vehicle in that the present invention could be utilized in conjunction with all types of vehicles and the invention particularly relates to a floor construction, generally referred to by the numeral 11, of the vehicle 10.

Figure 2:
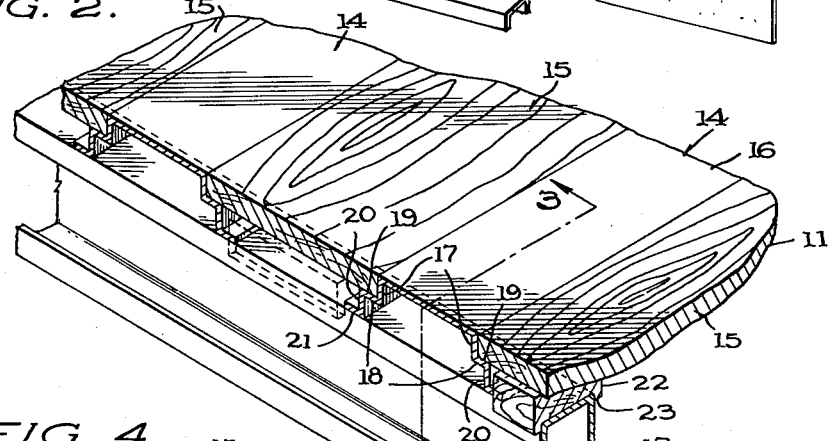
FIGURE 2 is an enlarged fragmentary perspective view of an intermediate part of the floor construction starting at the rear along the line 2—2 of FIGURE 1.

The vehicle 10 includes a suitable frame construction, generally referred to by the numeral 12. As is best shown in FIGURE 2, the frame construction 12 includes a transverse support 13. The transverse support 13 is repeated throughout the length of the body of the vehicle 10 and is illustrated as being of a C-shaped cross-sectional channel type. The transverse supports 13 will be connected together into the frame 12 in any desired conventional manner.

The floor construction 11 is supported by the transverse supports 13 and includes metal beams 14 and wooden strips or planks 15 disposed in alternating relation. It is to be noted that the wooden strips or planks 15 are principally supported by the metal beams 14.

The metal beams 14 illustrated in FIGURE 2 are of a channel cross-section, and each includes an uppermost web 16 which is horizontally disposed and which has formed along the side edges thereof depending vertical flanges 17 which are side flanges. The side flanges 17 terminate at their lower edges in outwardly directed horizontal flanges 18 which define upwardly facing seats 19 for the side edges of the wooden strips or planks 15.

Each of the metal beams 14 includes a lower side flange 20 at the outer edge of each of the horizontal flanges 18. The lower side flanges 20 terminate in outwardly directed mounting flanges 21. The mounting flanges 21 are seated on the upper surface of the transverse support 13 and serve to support the beams 14. The mounting flanges 21 may be secured to the transverse supports 13 in any desired manner.

It is to be noted that the seats 19 are disposed at midheight of the beams 14. As a result, the wooden strips or planks 15 need not be of the thickness corresponding to the heights of the metal beams 14. In this manner, by properly designing the metal beams 14, the metal beams 14 may be of a greater height than normal so as to permit an increase in strength and stiffness for a given weight of metal beam. On the other hand, the wooden strips or planks 15 may be of the desired thickness so that there can be an economical use of wood in conjunction with the metal beams 14.

Although the wooden strips or planks 15 are primarily supported by the metal beams 14, it is to be noted that the wooden strips or planks 15 are also supported by means of filler blocks 22. The filler blocks 22 have recessed bottom portions 23 receiving the upper portions of the transverse supports 13. The filler blocks 22 extend generally between the mounting flanges 21 of adjacent metal beams 14 and have the upper surfaces thereof in engagement with the undersurfaces of the corresponding ones of the wooden strips or planks 15.

Figure 4:
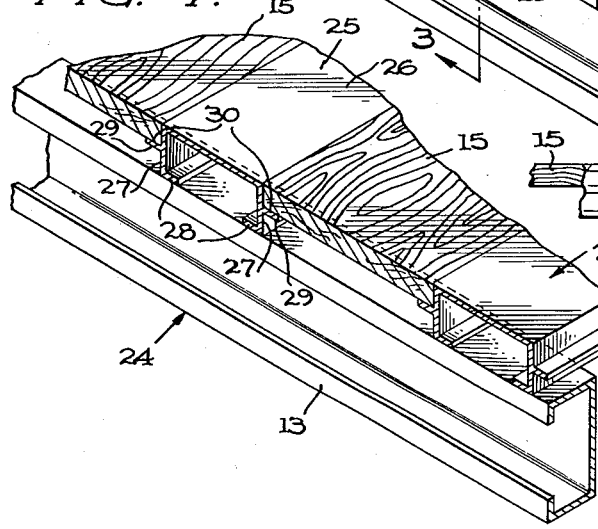
FIGURE 4 is a fragmentary perspective view similar to FIGURE 2 and showing a modified form of metal beam used in the floor construction.
Figure 3:
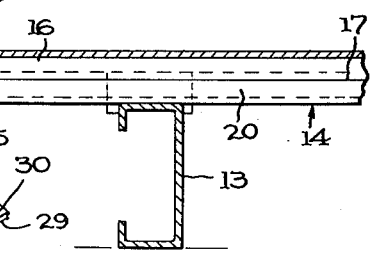
FIGURE 3 is an enlarged fragmentary longitudinal vertical section view taken along the line 3—3 of FIGURE 2, and shows further the details of the floor construction.

Referring now to FIGURE 4 in particular, it will be seen that there is illustrated a modified form of floor construction generally referred to by the numeral 24. The floor construction 24 includes the transverse supports 13 and the wooden strips or planks 15. However, the metal beams 14 have been replaced by a modified form of metal beam, generally referred to by the numeral 25. Each metal beam 25 is also of a generally channel-shaped cross-section and includes an upper web 26 and a pair of depending side flanges 27. The side flanges 27 terminate at their lower edges in inturned mounting flanges 28 which are seated on the upper surfaces of the transverse supports 13. The side flanges 27 are also provided intermediate the upper and lower ends thereof with outwardly directed flanges 29 the upper surfaces of which define upwardly facing seats 30 for the edges of the wooden strips or planks 15.

Reference is now made to FIGURE 5 wherein there is illustrated another form of floor construction, generally referred to by the numeral 31. The floor construction 31 will be supported by the transverse supports 13 in the same manner as that described above with respect to the floor constructions 11 and 24. The floor construction 31 is formed of steel beams, generally referred to by the numeral 32, which are alternated with wooden strips or planks 33.

Each of the metal beams 32 is of a channel section, and includes an uppermost web 34 which is horizontally disposed and is provided at the opposite edges thereof with depending side flanges 35 which extend generally midheight of the metal beam 32. At the lower edges of the upper side flanges 35 are outwardly directed horizontal flanges 36, the upper surfaces of which define upwardly facing seats 37 on which the wooden strips or planks 33 are seated. The flanges 36 terminate in lower side flanges 38 which, in turn, terminate in inwardly directed lower mounting flanges 39. It is to be noted that the mounting flanges 39 are relatively wide so as to project into underlying relation with respect to the web 34.

In FIGURE 6, there is illustrated another form of floor construction, generally referred to by the numeral 40. The floor construction 40 is made up of a plurality of metal beams, which are generally referred to by the numeral 41, and wooden planks or strips 42 which are disposed in alternating relation with respect to the metal beams 41.

Each of the metal beams 41 is of a channel-shaped cross-section and includes an upper web 43 which is horizontally disposed and which is provided at the opposite edges thereof with depending side flanges 44. The side flanges 44 terminate at their lower edges in relatively wide outwardly directed mounting flanges 45 which are horizontally disposed. The side flanges 44 are also provided with outwardly directed horizontal flanges 46 which are generally midheight of the side flanges 44. The horizontal flanges 46 define upwardly facing seats 47 on which the wooden strips or planks 42 are seated.

Reference is now made to FIGURE 7 wherein there is illustrated still another form of floor construction generally referred to by the numeral 48. The floor construction 48 is supported by the transverse supports 13. The floor construction 48 includes a plurality of metal beams, which are generally referred to by the numeral 49, and wooden strips or planks 50 which are disposed in alternating relation with respect to the metal beams 49.

Each metal beam 49 is generally of a channel-shaped cross-section and includes an upper horizontally disposed web 51 which terminates at the opposite side edges thereof in depending side flanges 52. The side flanges 52 terminate at their lower ends in lower horizontal mounting flanges 53 which extend both inwardly and outwardly with respect to the respective ones of the side flanges 52. In addition, each side flange 52 is provided with an outwardly directed horizontal flange 54 intermediate the height of the respective side flange 52. Each of the flanges 54 defines an upwardly facing seat 55 and the wooden strips or planks 50 are seated on the seats 55 and supported by the flanges 54.

It is to be noted that the floor construction 48 incorporates the filler blocks 22 which are seated on the transverse supports 13 between the flanges 53 and aid in supporting the wooden strips or planks 50.

Reference is now made to FIGURE 8 in particular, wherein there is illustrated one of the filler blocks 22. The recess 23 formed in the underside of the filler block 22 for receiving the upper portion of a respective one of the transverse supports 13 is clearly illustrated in this figure.

It will be apparent from the foregoing description of the several forms of floor construction disclosed herein, that a high strength and relatively stiff, yet light weight metal beam may be utilized in a floor construction in a manner not heretofore followed. By supporting the wooden strips of planks from the transverse supports, as is customary practice, it will be seen that the metal beams may be of a greater height than customary and at the same time, the thickness of the wooden strips or planks may be held to that required for the particular floor construction. Thus, not only may greater strength and stiffness be obtained with less weight as far as the metal beams are concerned, but also the wooden strips or planks may be of a thinner than normal construction, both of these providing for a savings in material.

Although several embodiments of the invention have been illustrated and described herein, it is to be understood that further minor modifications may be made in the invention within the spirit and scope of the invention, as defined in the appended claims.

I claim:

1. A truck bed comprising an elongated rectangular frame including lower transverse, longitudinally spaced, metal support members, a plurality of transversely spaced, mutually parallel, metal beams extending longitudinally of and the length of said frame intermediately between the frame sides and overlying and fixedly secured to said lower transverse support members, said beams having a relatively deep cross-section and including a horizontal web, the upper surface of said web comprising the load bearing surface of said truck bed, said beams including opposed, depending vertical side flanges terminating in lower mounting horizontal flanges resting on said transverse support members, said vertical side flanges including intermediate, upwardly facing seats extending the length of said beams, and relatively thin wooden planks resting on the seats of adjacent beams in generally co-planar relation with the upper surfaces of said webs for forming the remaining bearing surface of said truck bed.

2. The structure of claim 1 wherein said wooden planks are spaced above the upper surface of said transverse supports, and filler blocks interposed between the opposed surfaces of said planks and transverse members, said filler blocks including a transverse groove through the undersurface conforming to and receiving therein the upper portion of a transverse member.

3. The structure of claim 1 wherein said seats comprise intermediate laterally projecting flanges integral with said side flanges, said mounting flanges extending normal to and on opposite sides of the lower portion of said side flanges.

4. The truck bed of claim 1 wherein each of said beams is of a channel-shaped cross-section and has lower mounting flanges at the lower ends of said side flanges, said flanges being outturned.

5. The truck bed of claim 1 wherein each of said beams is of a channel-shaped cross-section and has lower mounting flanges at the lower ends of said side flanges, said flanges being inturned.

6. The truck bed of claim 1 wherein said side flanges are stepped to form said seats.

7. The truck bed of claim 1 wherein said side flanges are upright and have horizontal plank supporting flanges extending outwardly therefrom and forming said seats.

8. A truck bed comprising an elongated rectangular frame including lower spaced support members, a plurality of mutually parallel, metal beams extending transversely of said lower support members intermediately between the frame extremities and overlying and fixedly secured to said lower support members, said beams having a relatively deep cross section and including a horizontal web, the upper surface of said web comprising the load bearing surface of said truck bed, said beams including opposed, depending vertical side flanges terminating in lower mounting horizontal flanges resting on said support members, said vertical side flanges including intermediate, upwardly facing seats extending the length of said beams, and relatively thin wooden planks, each plank having an upper surface and a lower surface, said lower surfaces of said planks resting on the seats of adjacent beams with said upper surfaces of said planks being in generally coplanar relation with the upper surfaces of said webs for forming the remaining bearing surface of said truck bed.

References Cited in the file of this patent
UNITED STATES PATENTS

| | | |
|---|---|---|
| 1,749,978 | Koehler | Mar. 11, 1930 |
| 2,100,323 | Fitch | Nov. 30, 1937 |
| 2,214,547 | Bonsall | Sept. 10, 1940 |
| 2,256,037 | Reid | Sept. 16, 1941 |
| 2,307,149 | Milz et al. | Jan. 5, 1943 |
| 3,080,021 | Muir | Mar. 5, 1963 |

FOREIGN PATENTS

| | | |
|---|---|---|
| 771,298 | Great Britain | Mar. 27, 1957 |

OTHER REFERENCES

Imperial Chemical Ind. Ltd., 834,438, May 11, 1960.